(No Model.) 2 Sheets—Sheet 1.

L. STEIGERT.
MEAT CUTTING MACHINE.

No. 546,437. Patented Sept. 17, 1895.

Witnesses:
John C. Krieger
John Weber

Inventor:
Leopold Steigert,
By T. C. Brecht,
Attorney.

(No Model.) 2 Sheets—Sheet 2.
L. STEIGERT.
MEAT CUTTING MACHINE.
No. 546,437. Patented Sept. 17, 1895.
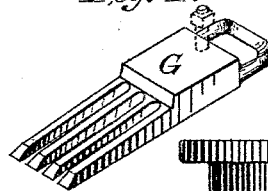
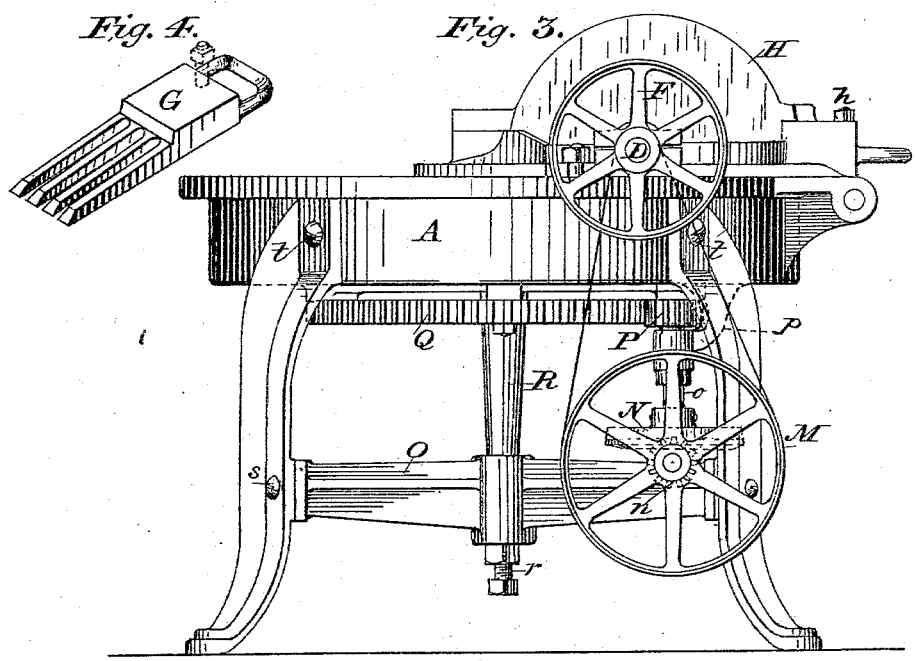
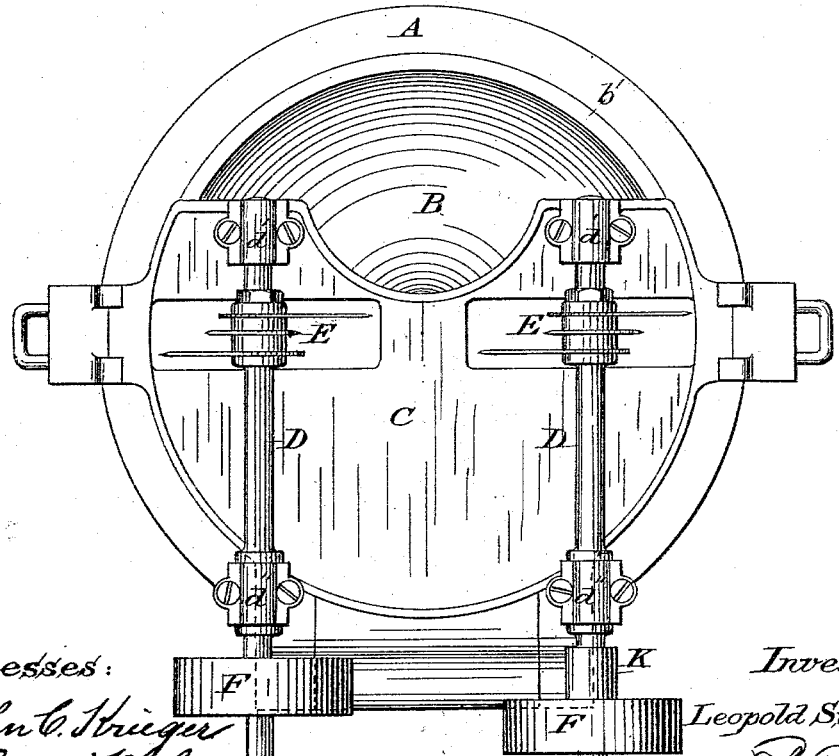
Witnesses:
John C. Krieger
John Weber
Inventor:
Leopold Steigert,
By T. C. Brecht,
Attorney.

UNITED STATES PATENT OFFICE.

LEOPOLD STEIGERT, OF CINCINNATI, OHIO.

MEAT-CUTTING MACHINE.

SPECIFICATION forming part of Letters Patent No. 546,437, dated September 17, 1895.

Application filed April 24, 1893. Serial No. 471,671. (No model.)

*To all whom it may concern:*

Be it known that I, LEOPOLD STEIGERT, a citizen of the United States, residing at Cincinnati, in the county of Hamilton and State of Ohio, have invented certain new and useful Improvements in Meat-Cutting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in that class of meat-cutting machines in which a series of rotary cutters manipulate or cut the meat in a rotating pan in such way that no oil or other objectionable matter from any of the working or operating parts can become mixed with the meat; and the object of the machine is to produce a meat-cutting machine that is very simple in construction in all its parts; not liable to get out of order; that can be operated with very small power; that all its parts are easily accessible for repair, replacing any broken or worn-out parts, or for cleaning; furthermore, to adjust those parts wearing out or requiring adjustment when necessary, and, finally, to produce a machine that can be sold at a moderate cost.

My invention consists in the construction of certain details and arrangement of parts, as will be more fully described hereinafter, and specifically pointed out in the claim, reference being had to the accompanying drawings and the letters of reference marked thereon.

Like letters indicate similar parts in the different figures of the drawings, in which—

Figure 1:
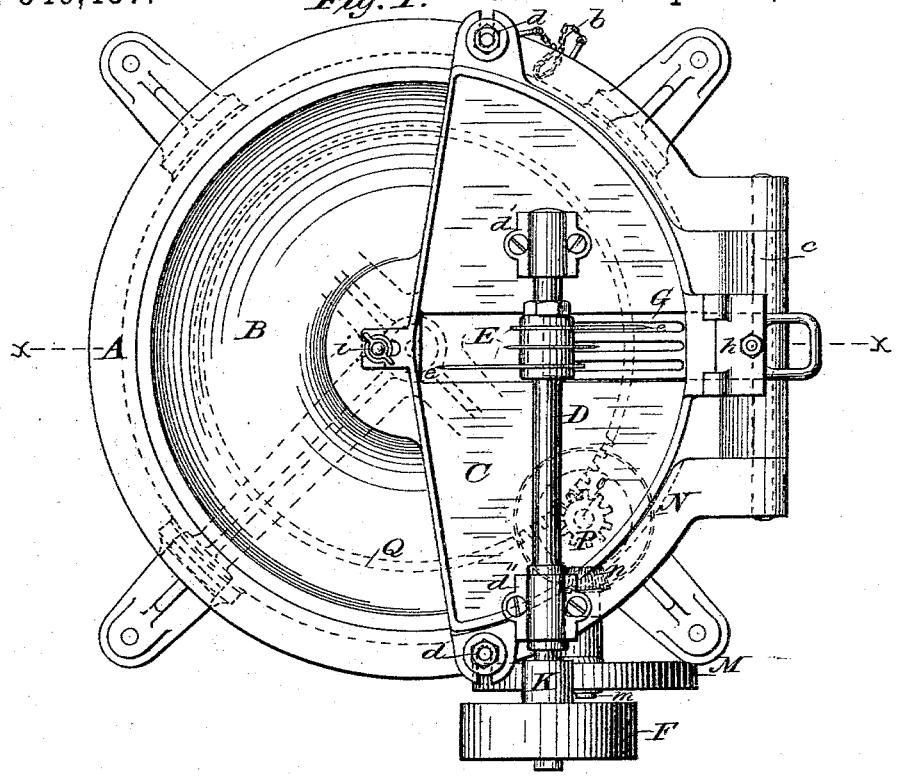
Figure 2:
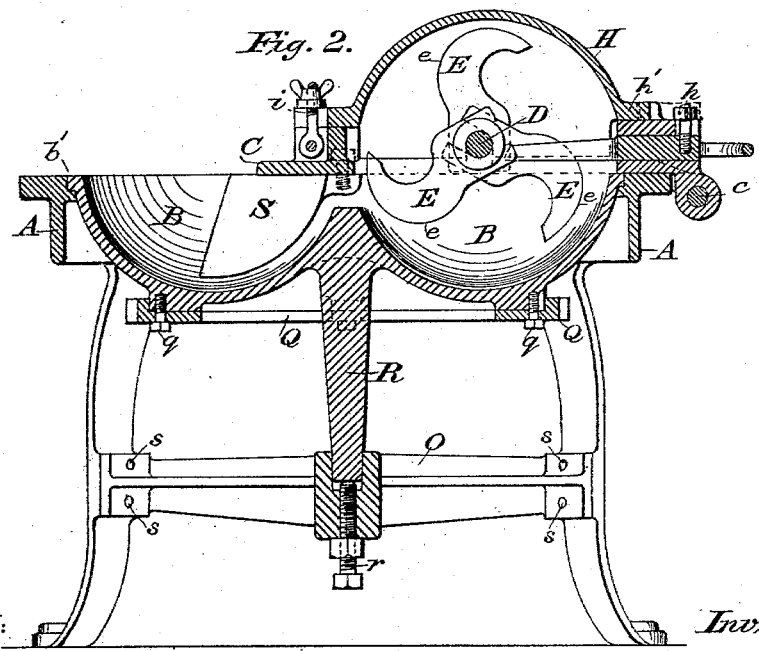

Figure 1 represents a plan or top view of the meat-cutting machine. Fig. 2 is a vertical section of the same on lines $x\ x$. Fig. 3 is a side elevation of the same. Fig. 4 is a detail view of the removable comb or scraper. Fig. 5 is a modification of Fig. 1.

In the drawings, A represents a suitable frame or stand supported on legs and made of any size and proper material desired. In the upper part of the frame A is formed a groove for supporting the flange $b'$ of a bowl-shaped receptacle B, into which the meat to be cut is placed. About half the bowl is usually closed by a flat cover C, which is hinged at one side, as at $c$, while the opposite side can be fastened in place by the bolts $d$, and at one side is placed a small chain $b$ to prevent opening it too far. On the upper side of the cover are arranged the bearings $d'\ d''$ for supporting a shaft D, upon which are secured the cutters E, which are preferably of S shape, and on its outer end a pulley F, which is the driving-pulley to which the motive power is applied. The cutters are arranged centrally and to one side of the bowl in an opening in the cover. Between them are placed the fingers or scrapers G, which are made in one piece and are provided with a handle for withdrawing them. A removable cover H is placed over the cutters and is held in place at one end by a bolt $h$, while the opposite end is secured by an open slot and a pivoted bolt and nut $i$. In close proximity to the pulley F is placed another smaller pulley K, imparting motion to a pulley M on a countershaft $m$, supported in a suitable bracket-bearing, and having on its inner end a pinion $n$, meshing with a bevel-wheel N, that is secured on the vertical shaft $o$. This shaft is supported at one end in a step-bearing on one of the arms of the spider O, while its upper end is held by a bracket $p$, and is provided at that end with a pinion P, which meshes with the annular wheel Q. This wheel is secured to the lower side of the bowl or receptacle B by four lugs and the tap-bolts $q$ and revolves it. The bowl B is provided with the vertical shaft R, which is stepped in the hub of the spider O, and in said hub is tapped a set-screw $r$, with a lock or jam nut, to hold it in position and serves to adjust the bowl, if necessary. The spider O is secured firmly to the legs of the frame by lugs and bolts $s$, and the legs themselves are also secured in place by tap-bolts $t$, all of which serve to take the machine apart in an easy and expeditious manner for packing and shipping in a small compass. By the easy tilting up of the cover H the knives can be readily sharpened, and by the tilting of the cover C, after the belt has been thrown from the pulley M, the receptacle B can be very easily and conveniently cleaned, while when the cover is down in its place grease, dust, &c., cannot become mixed with the meat, which is always a very desirable expedient. The fingers or scrapers are arranged in such manner that the knives E can pass freely between them, and any meat carried upward by them will be scraped off when the knives are revolved.

In the modification shown in Fig. 5 two sets of knives E are represented on separate shafts D, receiving motion from separate pulleys F. The object of this plan is to expedite the cutting of the meat in the bowl. The cover C is in this instance also made double, and the meat to be cut is introduced through the opening left at one side. It will be readily seen that the gearing in this machine is so arranged that the bowl will revolve very slowly, while the cutters are revolved very rapidly. It will also be noticed that the cutters by their peculiar shape will exert a shearing cut on the meat instead of the ordinary stamping cut produced by the vertical reciprocating knives now usually employed. The cutters are provided on their convex edges $e$ with their cutting-edges, while the rear sides are made blunt. The bowl B is made of annular concave cross-section, as best seen in Fig. 2, and the shaft R is cast in one piece with it to avoid the extra expense of fitting them together if made separate. If desired, the bolt and nut $i$ may be dispensed with and the bolt $h$ lengthened, as in Fig. 4, with the lug $h'$ prolonged, to be clamped by the nut on said bolt $h$, securing the cover H and scraper G at the same time. The scraper S, secured to the cover C, serves to turn the meat over.

Having thus described my invention, what I claim, and desire to secure by Letters Patent, is—

In a meat cutting machine, the combination, with a frame, of a bowl therein, a cover hinged to the bowl at one side and provided with a guide way, a finger plate within the guide way, the outer end of which is provided with a handle for removing it, and means for securing the plate in the cover, a shaft journaled above the cover, and provided with knives adapted to be operated within the bowl, and to be passed between the fingers of the plate, substantially as set forth.

In testimony whereof I affix my signature in presence of two witnesses.

LEOPOLD STEIGERT.

Witnesses:
JOHN C. KRIEGER,
JOHN WEBER.